Patented Nov. 26, 1946

2,411,590

UNITED STATES PATENT OFFICE 2,411,590

VINYL RESIN COATING COMPOSITION

George M. Powell, 3rd, South Charleston, W. Va., assignor to Carbide and Carbon Chemicals Corporation, a corporation of New York No Drawing. Application July 3, 1943, Serial No. 493,427

8 Claims. (Cl. 148—6.5)

This invention relates to vinyl resin coating compositions having a controlled and limited reactivity on heating.

Vinyl resins formed by the copolymerization of vinyl compounds with alpha, beta-olefinic carboxylic acids are known. Those resins which contain a relatively large amount of the copolymerized acid are soluble in dilute alkalies and in many common organic solvents. It has heretofore been proposed to insolubilize these resins by esterifying them with polyhydric alcohols, such as glycerine and polyvinyl alcohol. Such alkyd-type condensation products have insufficient resistance to water for many purposes.

According to this invention, copolymers of vinyl halides, vinyl esters of lower fatty acids, and alpha, beta-olefinic carboxylic acids, as well as copolymers of vinyl halides with alpha, beta-olefinic carboxylic acids, which are soluble in a number of common organic solvents, are rendered more resistant to solvents by an essentially new type of treatment. This treatment involves applying such copolymers admixed with alcohol-soluble, heat-reactive aminoplasts, such as urea-formaldehyde or melamine-formaldehyde resins, to a surface to be coated, and then baking the coating. As a result of the heat treatment, a water-resistant coating is obtained which is either insoluble in the original solvents for the copolymer resins, or which has much enhanced resistance to these solvents. In addition, the heat-treated coating has a higher softening point than coatings formed of the original copolymers.

The presence of the combined carboxylic acid in the copolymers plays an important part in the insolubilization and the improvement in water resistance which occurs, since comparative tests have established that these phenomena are not observed when vinyl halide polymers or copolymers of vinyl halides with vinyl fatty acid esters, which do not contain alpha, beta-olefinic carboxylic acids combined in the polymer, are heat-treated with the heat-reactive urea-formaldehyde or melamine-formaldehyde resins. Furthermore, the urea-formaldehyde and melamine-formaldehyde resins are slightly more compatible with the copolymers containing combined alpha, beta-olefinic carboxylic acids. They show much less tendency towards formation of a prominent reticulated pattern in the baked coatings, than they exhibit in the unmodified vinyl halide polymers or copolymers in the absence of a blending ingredient, such as a vegetable oil or alkyd resin as described in an application of Powell and McKnight, Serial No. 429,112, filed January 31, 1942, now Patent No. 2,343,907, March 14, 1944. However, vegetable oils and alkyd resins may be present in the coating compositions of this invention. In addition to improving the resistance to water and solvents of coatings containing the vinyl halide polymers or copolymers modified with the alpha, beta-olefinic carboxylic acids, the urea-formaldehyde and melamine-formaldehyde resins act as heat stabilizers for the vinyl halide resins in a manner set forth in the above-identified application of Powell and McKnight.

An important feature of the present invention is that the amount of the heat-reactive aminoplasts employed may be controlled so as to improve the softening point and solvent resistance of the vinyl resin coatings in accordance with specific requirements, without seriously decreasing the flexibility, toughness, and chemical resistance of the resins. Films of the urea-formaldehyde and melamine-formaldehyde resins alone, usually tend to be brittle, because of the extensive three dimensional polymerization or condensation involved in the thermosetting reaction. On the other hand, the vinyl resins are believed to have essentially one and two dimensional molecular structures, which may account for their flexibility. However, the three dimensional aminoplasts in minor amounts, do not seriously decrease the flexibility of the vinyl resins and effect the specific improvements mentioned above.

In more detail, the types of vinyl resins to which this invention is applicable are those formed by the copolymerization of vinyl halides, such as vinyl chloride or vinyl bromide, with aliphatic, alpha, beta-olefinic carboxylic acids, or by the copolymerization of vinyl halides, vinyl esters of lower fatty acids, such as acetic, propionic and butyric acids, and the aliphatic, alpha, beta-olefinic carboxylic acids. In this latter instance, three component copolymers are formed. The copolymerization may be carried out in the absence of any solvent or diluent, or the monomers may be dissolved in solvents or emulsified in water prior to polymerization. The temperature of polymerization may be between 30° and 80° C., and oxygen-yielding catalysts, such as hydrogen peroxide, benzoyl peroxide, and potassium persulphate may be employed. Certain alpha, beta-olefinic carboxylic acids, such as maleic acid, copolymerize at a faster rate than the vinyl halides or mixtures of vinyl halides and vinyl aliphatic esters. In such instances, allowance for this can be made by adjusting the charging ratio of the monomers, or by adding the maleic acid in small amounts during the polymerization.

The aliphatic, alpha, beta-olefinic carboxylic acids all contain the resinophoric group,

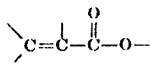

and the term "acids" also includes the anhydrides of the acids. The acids may be either monobasic or polybasic and may contain one or more olefinic groups in addition to the one which is in a conjugated position with the C=O linkage. Examples of suitable acids include maleic acid, fumaric acid, mono-esters of fumaric and maleic acids, maleic anhydride, acrylic acid, α-methacrylic acid, crotonic acid, citraconic acid and its anhydride, itaconic acid and its anhydride, chlormaleic acid, and the like. Examples of monoesters of maleic and fumaric acids include monomethyl fumarate and mono-2-ethyl-hexyl maleate, as well as other lower mono-alkyl esters of these acids.

The amount of the alpha, beta-olefinic carboxylic acid which need be combined in the vinyl halide polymers or copolymers is not large in order that insolubilization of the coating may occur on heat-treatment with the urea-formaldehyde or melamine-formaldehyde resins. Amounts of combined acid between about 0.5% and 20% of the polymer are usually sufficient, and for most purposes, a resin containing from 0.5% to 10% of combined carboxylic acid is satisfactory. Dibasic acids, such as maleic acid, are usually effective in smaller amounts than monobasic acids. When vinyl esters are present in the copolymer, in addition to vinyl halides and the carboxylic acids, their amount may vary from 3.2% or 5% to 15, 20, 35 or 40% by weight of the copolymer. The molecular weight of the resins as determined by Staudinger's method may vary from 5,000 to 30,000, or higher. The resins described above are insoluble in dilute solutions of sodium hydroxide.

The heat-reactive urea-formaldehyde resins or melamine-formaldehyde resins are well known. They are usually formed by heating urea or melamine with a molar excess of formaldehyde. The initial heating is under non-acidic conditions, and the final heating is in the presence of an acidic catalyst, and a solvent, such as butanol. Water is removed during the latter stage, and the reaction is stopped while the resin is still soluble in alcohol. The resins may be modified during manufacture with other ingredients such as ethylene glycol phthalate resins having unreacted hydroxyl groups, polyhydric alcohols, vegetable oils, and the like. In addition, both urea and melamine may be used in the same resin if desired, or other nitrogen derivatives, such as dicyandiamid, thiourea, and the various diazine and triazine derivatives, may be used alone or in combination with other starting materials. In general, resins of these types are capable of undergoing insolubilization reactions after deposition in film form, and are characterized by the relative speed of these thermosetting reactions even at baking temperatures as low as 200° F.

When such heat reactive aminoplasts are blended with the acid modified vinyl resin and films are deposited from such mixtures and baked, it is possible that some degree of reaction between the two resinous ingredients occurs. Because of the obvious difficulties, this has not been experimentally established, however, but in any event a distinct improvement in resistance of the film to attack by solvents, to softening under heat, and to thermal decomposition is observed. The amount of heat reactive resin in such mixtures may vary from about 5 to 30 parts of such resin per 100 parts of the modified vinyl resin, depending, to some extent, on the amount of carboxylic acid combined in the vinyl resin. About 10 to 20 parts of the heat-reactive resin per 100 parts of the modified vinyl resin are preferred.

The coating composition of this invention may be applied to any surface which will withstand the heat-treatment required. Thus, it may be applied as a protective coating to foils, sheets, panels, wires, rods and tubes made of metals, such as iron, tin plate, zinc, copper, aluminum, lead, magnesium, and their alloys; it may also serve as a water-resistant coating for cellulosic sheet material, such as porous papers, glassine paper, waxed papers, and regenerated cellulose sheeting. It may be used to coat textile fabrics made of yarns composed of cotton, wool, viscous rayon, cellulose acetate, or linear polyamides. It may also serve as an oxidation-resistant and solvent-resisting coating for natural rubber, butadiene-styrene rubbers, butadiene-acrylonitrile rubbers, and other synthetic rubbers and rubber substitutes, such as sodium polysulfide-ethylene dichloride or dichlorethylether condensation products, gamma polyvinyl chloride and copolymers of vinyl chloride and vinyl acetate having molecular weights above 18,000 and vinyl chloride contents of about 95%, containing about 30% to 45% plasticizer. It may be used to apply a solvent-resistant coating on resinous sheet material which otherwise may be attacked by solvents, such as sheets composed of cellulose acetate, cellulose nitrate and vinyl resins, for instance, copolymers of vinyl chloride and vinyl acetate. It may be used to protect wood and concrete articles from moisture, or to impart chemical resistance to articles molded from phenol-formaldehyde resins.

The metal sheets may already contain a decorative or primer coating before the composition of this invention is applied, and such coatings may consist of solid color coatings, varnishes, lacquers, or lithographic prints. Similarly, the plastic sheets to be protected may have press-polished, matte or embossed surfaces.

The coating composition exhibits good adhesion to various types of surfaces, but it finds its most useful adaptation in applications where the chemical inertness; acid, alkali, oil, and grease resistance; flexibility; abrasive resistance, and toughness of the vinyl resins are desired, but a coating of higher softening point and greater resistance to solvents and boiling water is required. Thus, the coating composition of this invention gives excellent service as an adherent, non-toxic lining for food or beverage containers made of metal, in which the food or beverage is packaged at temperatures of 212° F. or higher to insure sterility. Also, many of the present vinyl resin coatings for paper do not have a sufficiently high softening temperature to prevent "blocking" at summer temperatures, especially in warehouses exposed to the sun. However, paper coatings containing the modified vinyl resin heat-treated in situ with the heat-reactive urea-formaldehyde or melamine-formaldehyde resins have higher softening points and do not "block" even at temperatures of 180° F.

Another illustration of the utility of the new coatings in this respect is as a top or finishing coating for cloth coated with a highly plasticized vinyl resin, such as a copolymer of vinyl chloride with vinyl acetate or a plasticized polyvinyl partial butyral resin, which may itself be of a thermosetting or heat-curing type. Upon heat-treatment, the top coating is converted to its insoluble form and insures that the coated cloth does not block at temperatures of 180° F. or higher. Another advantage is that such top coatings tend to prevent excessive loss of plasticizer by evaporation, and prevent plasticizer exudation or "sweat-out," both where this is caused by the underlying resin absorbing water, as is sometimes the case with highly plasticized base coatings of thermoplastic polyvinyl partial butyral resins, or where "sweat-out" is caused by diffusion of the plasticizer to the surface. For coating cloth, it is desirable that the top coating also be plasticized, but not necessarily to such an extent as to equal the flexibility of the base coating. To prevent the plasticizer of the base coating from penetrating the cloth, a primer coating of the modified vinyl resin and heat-reactive resin may be applied to the cloth.

Composite coatings prepared in this manner offer advantages not easily obtainable by other methods. Thus coated fabrics of very good flexibility can be prepared by using high proportions of plasticizer in the intermediate coats, while the less soluble top coat and base coat, based upon compositions of heat reactive aminoplasts blended with the modified vinyl resins, prevent escape of the excess plasticizer, which otherwise would occur and make the surface "tacky" at temperatures of 150°–200° F.

The coating composition in combination with suitable plasticizers may also be applied in dilute solution to impregnate cotton fabrics of the type used in shirts, collars and overalls, whereby about 1% to 5% of the composition by weight of the cloth is deposited as a coating over the fibers of the cloth to improve the wearing qualities of the cloth and its resistance to abrasion. The unplasticized coating composition may also be used to improve the stiffness and crease-resistance of fabrics, such as curtain fabrics, or pile fabrics by spreading a dilute solution of the composition over the fabric, and subjecting it to a heat-treatment. Such fabrics are adapted to resist discoloration and deterioration on exposure to light and oxygen.

The temperature and duration of the heat treatment will vary depending on the surface to be protected. For metal coatings, a baking period of 10 to 15 minutes at temperatures of 350° to 400° F. is usually sufficient to convert the coating to its insoluble form. At lower temperatures, longer baking periods are usually required. For cloth or paper coatings, temperatures of 200° to 300° F. are usually the maximum the cloth or paper will withstand for prolonged periods, and, at these temperatures, baking times of about 30 to 60 minutes are usually necessitated to obtain coatings of improved softening point. For wire coatings, temperatures up to about 800° F., for periods of about 1 to 2 minutes may be employed.

Where the surface to be protected is sensitive to heat, thin films of the composite coating can be cured by exposure of the coated side to intense radiant heat for a brief period, as for instance, in an oven having a continuous conveyor belt. In this manner, damage to the heat-sensitive article can be minimized or avoided.

It has also been found that the presence in the coating of phosphoric acid or acid esters of phosphoric acid, such as the mono- or dialkyl acid phosphates, will accelerate the curing reaction, and result in more insoluble and adherent coatings of higher softening point and better resistance to boiling water. The amount of phosphoric acid or organic acid phosphate may be varied from less than 1% to over 30% by weight of the urea or melamine resin. About 10% of such compounds appears preferable because of the increasing incompatibility of higher proportions. Suitable alcohols for making the mono- and dialkyl phosphoric acid esters include methanol, ethanol, isopropanol, butanol, 2-ethyl butanol and 2-ethyl hexanol. The phosphoric acid may also be spread over the surface of ferrous metals to be coated, but better results are obtained if the surface of the iron or steel is lightly phosphatized by any of the known chemical or electrochemical treatments, such as the "Bonderizing process," to form a coating which does not crack on subsequent forming operations. The composite coating of this invention is then applied and baked for 10 to 15 minutes at 325° to 400° F.

In many instances, copolymers of vinyl chloride and vinyl acetate containing from 60% to 95%, and preferably from 85% to 88% of vinyl chloride may be included in the coating. These resins may be blended with the other resinous ingredients of the coating in amounts of 10, 20, 30, 40, 50, 60, 70, 80 or 90% depending on the solvent resistance and softening point which is required for the particular application. Where the larger amounts of the vinyl acetate-vinyl chloride copolymers are employed, it is usually necessary to include a small amount of a vegetable oil, an alkyd resin, or a vegetable oil-modified alkyd resin in the composite coating to avoid difficulties from "checking" of the film after baking. Castor oil or a castor oil-modified glycerylphthalate resin are preferred for this purpose.

The usual ketone solvents for vinyl resins may be employed in the coating compositions, but a coupling or blending solvent in addition to the ketone solvent is frequently desirable in order to obtain clear solutions of the vinyl resins and melamine or urea resins. Suitable coupling agents include alcohol-ethers, such as ethylene glycol monoethyl ether and ethylene glycol monoethyl ether.

The following examples will serve to illustrate the invention:

*Example 1*

Two clear lacquers of the following composition were prepared:

|  | A | B |
|---|---|---|
| Vinyl chloride (85%), vinyl acetate (15%), copolymer. Molecular weight 10,000 | Parts 20 | Parts |
| Vinyl chloride (85%), vinyl acetate (14%), maleic acid (1%), copolymer. Molecular weight 10,000 |  | 20 |
| Heat-reactive urea-formaldehyde resin (50% solution in butanol, 2 parts, capryl alcohol, 1 part) | 4 | 4 |
| Phosphoric acid | 0.1 | 0.1 |
| Ethylene glycol monomethyl ether | 10 | 10 |
| Methyl isobutyl ketone | 60 | 60 |
| Toluene | 60 | 60 |

Two coats of each lacquer were sprayed over sanded steel panels, and each panel was baked at 375° F. After baking for 15 minutes, the panel with coating A exhibited a prominent reticulated pattern of checks and cracks, whereas the panel with coating B was smooth. After 45 minutes heating, coating B exhibited better heat stability than coating A. After baking, coating B did not soften appreciably in contact with acetone, whereas coating A was distinctly softened and swollen.

*Example 2*

Two clear lacquers of the following composition were prepared:

|  | C | D |
|---|---|---|
|  | Parts | Parts |
| Vinyl chloride (85.0%), vinyl acetate (13.3%), maleic acid (1.7%) copolymer | 10 | 10 |
| Heat-reactive urea-formaldehyde resin (25% solution in ethylene glycol monoethyl ether, 5 parts, butanol, 2.8 parts and capryl alcohol, 1.4 parts) | 6 | 6 |
| Ethylene glycol monomethyl ether | 5 | 5 |
| Phosphoric acid |  | 0.1 |
| Methyl isobutyl ketone | 30 | 30 |
| Toluene | 30 | 30 |

Two coats of each lacquer were sprayed onto brightly sanded steel panels, and then baked for one hour at 350° F. Coating D showed better resistance to acetone than coating C, but both were distinctly better than coating A of Example 1. The softening point of coating D was somewhat higher than coating C, but the softening points of both coatings were about 30° to 40° F. higher than that of coatings which contain only the modified copolymer of vinyl chloride, vinyl acetate and maleic acid, which have a softening point of about 170° F. The softening points are determined by placing a piece of cheese cloth on the baked film under a one pound per square inch weight. The softening point is taken at the temperature at which the fibers of the cloth will print on the film after the pressure is applied for 30 minutes.

*Example 3*

Two clear lacquers were prepared as follows:

|  | E | F |
|---|---|---|
|  | Parts | Parts |
| Vinyl chloride (85%), vinyl acetate (14%), maleic acid (1%). Molecular weight 10,000 | 20 | 20 |
| Heat-reactive alkyd modified melamine-formaldehyde resin, 50% solids in solvent mixture consisting of 30% butanol, 20% capryl alcohol, and 50% mineral spirits | 8 | 8 |
| Phosphoric acid |  | 0.2 |
| Ethylene glycol monomethyl ether | 40 | 40 |
| Methyl isobutyl ketone | 40 | 40 |
| Toluene | 40 | 40 |

Two coats of each lacquer were applied to tin plated steel panels which contained a baked oleoresinous varnish of the type used for priming cans for packaging beverages, such as beer. Duplicate coats were also applied to black iron panels and both sets of panels were baked for 15 minutes at 275° F. Coating F had somewhat better resistance to solvents than did coating E, and it showed better adhesion after immersion in boiling water for 15 minutes. However, both coatings were much superior in these respects to coatings of unmodified copolymers of vinyl chloride and vinyl acetate, irrespective of whether such coatings contained urea or melamine resins. The heat stability of both coatings E and F was satisfactory, although in the tests on the black iron panels, coating F was somewhat better than coating E.

*Example 4*

A clear lacquer was prepared as follows:

Parts
Vinyl chloride (95%), vinyl acetate (3.2%), maleic acid (1.8%). Molecular weight about 12,000 _____ 20
Heat-reactive, alkyd modified melamine-formaldehyde resin, 50% solids in solvent mixture consisting of 30% butanol, 20% capryl alcohol, and 50% mineral spirits _____ 6
Phosphoric acid, 10% solution in ethylene glycol monomethyl ether _____ 1
Ethylene glycol monomethyl ether _____ 13
Methyl isobutyl ketone _____ 50
Toluene _____ 50

Two coats of the lacquer were applied by spraying to black iron panels and to tin plated steel panels having a primer coating of baked oleoresinous varnish. All panels were baked at 375° F. for 15 minutes. The resultant finishes were amber in color and very tough and adherent. They did not soften appreciably on soaking the panels in methyl ethyl ketone, nor did they blush or lose any of their adherent qualities after immersion of the panels in boiling water for one hour.

*Example 5*

Example 4 was repeated with equivalent results using monobutyl phosphoric acid in place of phosphoric acid.

*Example 6*

Example 4 was repeated employing a copolymer of vinyl chloride (84%), vinyl acetate (14%) and methacrylic acid (1%), and a finish was obtained which was resistant to solvents and to water.

*Example 7*

The following lacquer was prepared:

Parts
Vinyl chloride (92%), maleic acid (8%), copolymer. Molecular weight about 20,000__ 20
Heat-reactive alkyd modified melamine-formaldehyde resin, 50% solids in solvent mixture consisting of 30% butanol, 20% capryl alcohol, and 50% mineral spirits___ 6
Phosphoric acid, 10% solution in ethylene glycol monomethyl ether _____ 1
Ethylene glycol monomethyl ether _____ 13
Cyclohexanone _____ 100

Two coats were applied by spraying to steel panels, and the coating baked for 15 minutes at 375° F. The resultant finish showed good resistance to ketone solvents and to boiling water.

*Example 8*

This example illustrates a cloth coating in which the partially heat-reactive vinyl resin composition is employed as a solvent-resistant, non-blocking, finishing coating over a highly plasticized base coating containing a copolymer of vinyl chloride and vinyl acetate of relatively low molecular weight which has good flexibility but exhibits a tendency to "block" at temperatures of 150° F. to 180° F. The base coating had the following composition:

| | Per cent |
|---|---|
| Vinyl chloride (86%), vinyl acetate (14%) copolymer. Average molecular weight 10,000 | 21.2 |
| Yellow iron oxide pigment | 1.43 |
| Black iron oxide pigment | 1.64 |
| Lead titanate | 1.09 |
| Whiting | 8.44 |
| Dioctyl phthalate | 4.75 |
| Butyl ester of acetylated polymerized ricinoleic acid | 7.76 |
| Dicapryl phthalate | 3.19 |
| Light hydrocarbon distillate | 25.3 |
| Methylethyl ketone | 12.6 |
| Methyl isobutyl ketone | 12.6 |
| | 100.00 |

Several coats of this composition were applied to cloth and then a finishing coating of the following composition was applied:

| | Per cent |
|---|---|
| Vinyl chloride (85%), vinyl acetate (14%), maleic acid (1.0%) copolymer. Average molecular weight about 10,000 | 22.5 |
| Heat-reactive alkyd modified melamine-formaldehyde resin, 50% solids in solvent mixture consisting of 30% butanol, 20% capryl alcohol and 50% mineral spirits | 4.53 |
| Yellow iron oxide pigment | 1.52 |
| Black iron oxide pigment | 1.77 |
| Lead titanate | 1.18 |
| Whiting | 8.94 |
| Dioctyl phthalate | 1.76 |
| Butyl ester of acetylated polymerized ricinoleic acid | 3.00 |
| Dicapryl phthalate | 1.18 |
| Light hydrocarbon distillate | 15.82 |
| Methylethyl ketone | 18.48 |
| Methyl isobutyl ketone | 18.48 |
| Synthetic wax | 0.84 |
| | 100.00 |

Each coat was baked for a few minutes at 210° F. to remove solvents and the final coat was baked 30 minutes at 230° F.

The total coating weight was 3.5 to 4.2 ounces per square yard. The coating was flexible at 0° F. and it did not block at a temperature of 210° F.

*Example 9*

To obtain coated cloth of better resistance to solvents and boiling water, it is preferable to employ the heat-reactive vinyl resin composition in both the base coating and the top coating. The following compositions are suitable for this purpose:

| | Base coating | Top coating |
|---|---|---|
| | Per cent | Per cent |
| Vinyl chloride (85%), vinyl acetate (14%), maleic acid (1.0%) copolymer. Average molecular weight about 10,000 | 19.80 | 22.50 |
| Heat-reactive melamine-formaldehyde resin solution of Example 8 | 3.98 | 4.53 |
| Synthetic wax | | .84 |
| Whiting | 7.86 | 8.94 |
| Yellow iron oxide pigment | 1.34 | 1.52 |
| Black iron oxide pigment | 1.54 | 1.77 |
| Lead titanate | 1.03 | 1.18 |
| Methyl isobutyl ketone | 16.30 | 18.48 |
| Methylethyl ketone | 16.30 | 18.48 |
| Light hydrocarbon oil distillate | 13.80 | 15.82 |
| Butyl ester of acetylated polymerized ricinoleic acid | 7.58 | 3.00 |
| Dioctyl phthalate | 7.40 | 1.76 |
| Dicapryl phthalate | 3.07 | 1.18 |
| | 100.00 | 100.00 |

Several coats of the base composition were applied to the cloth by using a doctor knife, followed by one coat of the top coating. The final coating was baked for 30 to 60 minutes at 230° F. The coating did not "block" when sterilized with steam under 15 pounds per square inch pressure. In determining this, samples of the coated cloth were placed face to face under a pressure of one pound per square inch.

The coated cloth is useful for raincoats, tarpaulins, tents, ski clothing, gun coverings and the like. The cloth may be coated on both sides with the composition, or the uncoated side given a water-repellant treatment.

The above composition without the pigments is useful for coating paper and rubber articles, and may be applied by conventional methods. For instance, the paper may be coated employing a reverse roller machine, and the rubber articles may be coated by a spraying technique, after suitable thinning of the composition.

Modifications of the invention other than as specifically described in the examples will be apparent to those skilled in the art, and are included within the scope of the invention.

I claim:

1. A vinyl resin coating composition of a limited heat-reactive type comprising an acid-reacting vinyl resin of the group consisting of a copolymer of vinyl chloride, a vinyl ester of a lower saturated fatty acid, and an aliphatic, alpha, beta-olefinic carboxylic acid, in which from 3.2% to 40% of said ester and from 0.5% to 20% of acid, by weight of the copolymer, are combined therein, and a copolymer of vinyl chloride and an aliphatic, alpha, beta-olefinic carboxylic acid, in which from 0.5% to 20% of acid by weight of the copolymer is combined therein, and from 5% to 30% by weight of said acid-reacting vinyl resin of a heat-reactive, alcohol-soluble resin of the group consisting of urea-formaldehyde and melamine-formaldehyde resins, the composition being dispersed in an organic solvent.

2. A vinyl resin coating composition of a limited heat-reactive type comprising an acid-reacting vinyl resin of the group consisting of a copolymer of vinyl chloride, a vinyl ester of a lower saturated fatty acid, and an aliphatic, alpha, beta-olefinic carboxylic acid, in which from 3.2% to 40% of said ester and from 0.5% to 20% of acid, by weight of the copolymer, are combined therein, and a copolymer of vinyl chloride and an aliphatic, alpha, beta-olefinic carboxylic acid, in which from 0.5% to 20% of acid by weight of the copolymer is combined therein, from 5% to 30% by weight of said acid-reacting vinyl resin of a heat-reactive, alcohol-soluble resin of the group consisting of urea-formaldehyde and melamine-formaldehyde resins, and from 1% to 30% by weight of said heat-reactive resin of one of the group consisting of phosphoric acid and acid esters of phosphoric acid, the composition being dispersed in an organic solvent.

3. A coating composition of a limited heat-reactive type comprising a copolymer of vinyl chloride, vinyl acetate and maleic acid, in which from 3.2% to 40% of vinyl acetate and from 0.5% to 10% of maleic acid, by weight of the copolymer, are combined therein, from 5% to 30% by weight of said copolymer of a heat-reactive, alcohol-soluble resin of the group consisting of urea-formaldehyde and melamine-formaldehyde resins, and an organic solvent.

4. A coating composition of a limited heat-reactive type comprising a copolymer of vinyl chloride, vinyl acetate and maleic acid, in which from 3.2% to 40% of vinyl acetate and from 0.5% to 10% of maleic acid, by weight of the copolymer, are combined therein, from 5% to 30% by weight of said copolymer of a heat-reactive, alcohol-soluble resin of the group consisting of urea-formaldehyde and melamine-formaldehyde resins, a copolymer of vinyl chloride with vinyl acetate containing from 60% to 95% vinyl chloride, and an organic solvent.

5. A coating composition of a limited heat-reactive type comprising a copolymer of vinyl chloride and maleic acid, the amount of maleic acid combined in the copolymer being from 0.5% to 10% by weight of the copolymer, from 5% to 30% by weight of said copolymer of a heat-reactive, alcohol-soluble resin of the group consisting of urea-formaldehyde and melamine formaldehyde resins, and an organic solvent.

6. Process for coating smooth and extended surfaces which comprises applying to said surfaces a coating composition of a limited heat-reactive type comprising a dispersion in an organic solvent of an acid-reacting vinyl resin of the group consisting of a copolymer of vinyl chloride, a vinyl ester of a lower saturated fatty acid, and an aliphatic, alpha, beta-olefinic carboxylic acid, in which from 3.2% to 40% of said ester and from 0.5% to 20% of acid, by weight of the copolymer, are combined therein, and a copolymer of vinyl chloride and an aliphatic, alpha, beta-olefinic carboxylic acid, in which from 0.5% to 20% of acid by weight of the copolymer is combined therein, and from 5% to 30% by weight of said acid-reacting vinyl resin of a heat-reactive, alcohol-soluble resin of the group consisting of urea-formaldehyde and melamine-formaldehyde resins, forming a continuous film on said surface by baking the coating at temperatures between 200° F. and 800° F., and heat-treating said acid-reacting vinyl resin with said heat-reactive resin to form a coating on said article which is resistant to water and solvents.

7. Process for coating metals which comprises applying a primer coating comprising an oleoresinous varnish, baking said primer coating, and then applying a composition comprising a dispersion in an organic solvent of a copolymer of vinyl chloride, vinyl acetate and maleic acid, in which from 3.2% to 40% of vinyl acetate and from 0.5% to 10% of maleic acid, by weight of the copolymer, are combined therein, and from 5% to 30% by weight of the copolymer of an alcohol-soluble, heat-reactive resin of the group consisting of urea-formaldehyde resins and melamine-formaldehyde resins, baking said composition at a temperature of 325° F. to 400° F., and forming a coating on the metal which is resistant to solvents and to water.

8. Process for coating ferrous metal which comprises phosphatizing the metal surface, and then applying a composition comprising a dispersion in an organic solvent of a copolymer of vinyl chloride, vinyl acetate and maleic acid, in which from 3.2% to 40% of vinyl acetate and from 0.5% to 10% of maleic acid, by weight of the copolymer, are combined therein, and from 5% to 30% by weight of the copolymer of an alcohol-soluble, heat-reactive resin of the group consisting of urea-formaldehyde resins and melamine-formaldehyde resins, baking said composition at a temperature of 325° F. to 400° F., and forming a coating on the metal which is resistant to solvents and to water.

GEORGE M. POWELL, 3RD.